US011015050B2

(12) United States Patent
Almohsin et al.

(10) Patent No.: US 11,015,050 B2
(45) Date of Patent: May 25, 2021

(54) POLYMER GEL WITH NANOCOMPOSITE CROSSLINKER

(71) Applicant: Saudi Arabian Oil Company, Dhahran (SA)

(72) Inventors: Ayman Mohammed Almohsin, Doha (SA); Mohammed A. Bataweel, Dhahran (SA); Faheem Ahmed, Riyadh (SA); Edreese Alsharaeh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/898,735

(22) Filed: Jun. 11, 2020

(65) Prior Publication Data
US 2020/0362159 A1    Nov. 19, 2020

Related U.S. Application Data

(62) Division of application No. 16/159,303, filed on Oct. 12, 2018, now Pat. No. 10,774,211.

(60) Provisional application No. 62/571,478, filed on Oct. 12, 2017.

(51) Int. Cl.
| C08L 33/26 | (2006.01) |
| C09K 8/504 | (2006.01) |
| C09K 8/512 | (2006.01) |
| C08K 3/04 | (2006.01) |
| C08K 3/22 | (2006.01) |
| B82Y 30/00 | (2011.01) |
| B82Y 40/00 | (2011.01) |

(52) U.S. Cl.
CPC ............ *C08L 33/26* (2013.01); *C08K 3/04* (2013.01); *C08K 3/22* (2013.01); *C09K 8/5045* (2013.01); *C09K 8/512* (2013.01); *B82Y 30/00* (2013.01); *B82Y 40/00* (2013.01); *C08K 2003/2237* (2013.01); *C08K 2003/2244* (2013.01); *C08K 2201/011* (2013.01); *C08L 2312/00* (2013.01); *C08L 2666/54* (2013.01); *C09K 2208/10* (2013.01)

(58) Field of Classification Search
CPC ...... C08K 3/22; C08K 3/04; C08K 2201/011; C09K 8/512; C09K 8/5045; C08L 33/26; C08L 2666/54
USPC ...................................................... 524/413
See application file for complete search history.

(56) References Cited

U.S. PATENT DOCUMENTS

| 5,617,920 A | 4/1997 | Dovan et al. |
| 8,557,916 B1 | 10/2013 | Alsharaeh et al. |
| 9,475,981 B2 | 10/2016 | Abivin et al. |
| 2004/0154799 A1 | 8/2004 | Powell |
| 2009/0221453 A1 | 9/2009 | Mukhopadhyay et al. |
| 2010/0055458 A1 | 3/2010 | Jang et al. |
| 2013/0149211 A1* | 6/2013 | Bielawski ............ C07C 319/24 422/198 |
| 2016/0344035 A1* | 11/2016 | Zhamu ................. H01M 12/08 |

FOREIGN PATENT DOCUMENTS

| EP | 3331964 | 6/2018 |
| WO | WO 2019075314 | 4/2019 |

OTHER PUBLICATIONS

Reduced Graphene Oxide: Properties, Applications and Production Methods. Graphenea (Year: 2015).*
Al-Muntasheri et al., "Investigation of a High Temperature Organic Water Shutoff Gel: Reaction Mechanisms," SPE 97530, presented at the SPE International Improved Oil Recovery Conference, Dec. 5-6, 2005, 9 pages.
Alsharaeh et al., "Evaluation of nanomechanical properties of (styrene-methyl methacrylate) copolymer composites containing graphene sheets," Industrial & Engineering Chemistry Research, Nov. 2013, 11 pages.
Alsharaeh et al., "Microwave Irradiation Effect on the Dispersion and Thermal Stability of RGO Nanosheets within a Polystyrene Matrix," Materials vol. 7, Issue 7, Jul. 2014, 23 pages.
Chen et al., "Polyacrylamide and its derivatives for oil recovery," Dissertation for the degree of Doctor of Philosophy, Missouri University of Science and Technology, Fall 2016, 226 pages.
Dovan et al., "Delaying Geletion of Aqueous Polymers at Elevated Temperatures Using Novel Organic Crosslinkers," SPE-37246-MS, Society of Petroleum Engineers, presented at the International Symposium on Oilfield Chemistry, Feb. 18-21, 1997, 11 pages.
Khan et al., "Graphene based metal and metal oxide nanocomposites: synthesis, properties and their applications," Journal of Materials Chemistry A, vol. 3, No. 37, Jan. 1, 2015, 57 pages.
Kumar et al., "Nanostructured zirconia decorated reduced graphene oxide based efficient biosensing platform for non-invasive oral cancer detection," Biosensors and Bioelectronics, vol. 78, Apr. 1, 2016, 8 pages.
Li et al., "Fabrication and properties of machinable 3Y—Zr0"2/BN nanocomposites," Materials Science and Engineering: A, Elsevier, Amsterdam, vol. 397, No. 1-2, Apr. 25, 2005, 6 pages.

(Continued)

Primary Examiner — Doris L Lee
(74) Attorney, Agent, or Firm — Fish & Richardson P.C.

(57) ABSTRACT

A nanocomposite including a metal oxide and two-dimensional nanosheets. The metal oxid includes at least one of zirconia and titania, and the two-dimensional nanosheets include at least one of reduced graphene oxide and boron nitride. A weight ratio of the metal oxide to the two-dimensional nanosheets is in a range of 2:1 to 19:1, or in a range or 2:1 to 9:1. Making the nanocomposite includes forming a first aqueous dispersion including zirconia nanoparticles and graphene oxide powder, combining a reducing agent with the first aqueous dispersion, irradiating the first aqueous dispersion with microwave radiation, thereby yielding a second aqueous dispersion including zirconia and graphene, and separating the nanocomposite from the second aqueous dispersion, wherein the nanocomposite comprises zirconia and graphene.

6 Claims, 7 Drawing Sheets

(56) References Cited

OTHER PUBLICATIONS

Liu et al., "Microwave-assisted synthesis of TiO2-reduced graphene oxide composites for the photocatalytic reduction of Cr(vi)," RSC Advances, vol. 1, No. 7, Jan. 1, 2011, 5 pages.
Liu et al., "Photolatently modulable hydrogels using unilamellar titania nanosheets as photocatalytic crosslinkers," Nature Communications, vol. 4, No. 1, Jun. 18, 2013, 7 pages.
Liu et al., "Tough and highly stretchable graphene oxide/polyacrylamide nanocomosite hydrogels," Journal of Materials Chemistry, vol. 22, No. 28, Jan. 1, 2012, 8 pages.
Mahdavi et al., "Polyacrylamide/reduced graphene oxide-Ag nanocomposite as highly efficient antibacterial transparent film," Iranian Chemical Society, Journal, vol. 14, No. 1, Aug. 6, 2016, 10 pages.
Michael et al., "Enhanced Polyacrylamide Polymer Gels using Zirconium Hydroxide Nanoparticles from Water Shutoff at High Temperatures: The Thermal and Rheological Investigations," Ind. Eng. Chem. Res., vol. 57, No. 48, Nov. 6, 2018, 27 pages.
Mordina et al., "Impact of graphene oxide on the magnetorheological behaviour of BaFe12019 nanoparticles filled polyacrylamide hydrogel," Polymer, Elsevier Science Publishers B.V., GB, vol. 97, May 11, 2016, 15 pages.
Shan et al., "Graphene oxide enhanced polyacrylamide-alginate aerogels catalysts," Carbohydrate Polymers, vol. 203, Jan. 1, 2019, 26 pages.
Song et al., "Plasma-induced grafting polyacrylamide on graphene oxide nanosheets for simultaneous removal of radionuclides," Physical Chemistry Chemical Physics (RSC Publishing), Jan. 1, 2015, 24 pages.
Stengl et al., "h—BN—TiO 2 Nanocomposite for Photocatalytic Applications," Journal of Nanomaterials, vol. 2016, Jan. 1, 2016, 12 pages.
Taha and Lee, "Nano Graphene Application Improving Drilling Fluids and performance," IPTC 18539-MS, presented at the International petroleum Technology Conference, Dec. 6-9, 2015, 16 pages.
Tongwa et al., "Evaluation of a Nanocomposite Hydrogel for Water Shut-Off in Enhanced Oil Recovery Applications: Design, Synthesis and Characterization," Journal of Applied Polymer Science, Jul. 17, 2012, 8 pages.
Zhang et al., "Engineering the Unique 2D Mat of Graphene to Achieve Graphene-TiO 2 Nanocomposite for Photocatalytic Selective Transformation: What Advantage does Graphene Have over Its Forebear Carbon Nanotube?" ACS NANO, vol. 5, No. 9, Sep. 27, 2011, 10 pages.
Zhang et al., "TiO 2-Graphene Nanocomposites for Gas-Phase Photocatalyptic Degradation of Volatile Aromatic Pollutant: Is TiO 2-Graphene Turley Different from Other TiO 2-Carbon Composite Materials?" ACS NANO, vol. 4, No. 12, Dec. 28, 2010, 12 pages.
Zhou et al., "Preparation of a reduced graphene oxide/zirconia nanocomposite and its application as a novel lubricant oil additive," RSC Advances, vol. 5, No. 111, Jan. 1, 2015, 11 pages.
Zolfaghari et al., "Preparation and Characterization of Nanocomposite Hydrogels Based on polyacrylamide for Enhanced Oil Recovery Applications," Feb. 17, 2006, 8 pages.
PCT Invitation to Pay Additional Fees and, Where Applicable, Protest Fees, issued in International Application No. PCT/US2018/055590 on Dec. 18, 2018, 13 pages.
International Search Report and Written Opinion issued in International Application No. PCT/US2018/055590 dated Mar. 8, 2019, 21 pages.
PCT International Search Report and Written Opinion in International Appln. No. PCT/US2020/059038, dated Feb. 19, 2021, 13 pages.

\* cited by examiner

POLYMER GEL WITH NANOCOMPOSITE CROSSLINKER

CLAIM OF PRIORITY

This application is a divisional of and claims the benefit of priority to U.S. patent application Ser. No. 16/159,303, filed on Oct. 12, 2018, which claims priority to U.S. Provisional Patent Application Ser. No. 62/571,478, filed on Oct. 12, 2017, the entire contents of which are hereby incorporated by reference.

TECHNICAL FIELD

This disclosure relates to a polymer gel formed with a nanocomposite crosslinker for water shutoff in oil field applications.

BACKGROUND

Excess water production can limit the lifetime of an oil or gas well, and poses technical, economical, and environmental challenges. Water production is also a factor in oil and gas field damage mechanisms including as scale deposition, corrosion, sand production, and mineral dissolution. Polymer gels have been used to reduce water production from oil and gas fields. However, improvements are needed in polymer thermal stability and salt resistance.

SUMMARY

In a first general aspect, a nanocomposite includes a metal oxide including at least one of zirconia and titania, and two-dimensional nanosheets including at least one of reduced graphene oxide and boron nitride. A weight ratio of the metal oxide to the two-dimensional nanosheets is in a range of 2:1 to 19:1. In another example, a weight ratio of the metal oxide to the two-dimensional nanosheets is in a range of 2:1 to 9:1.

In a second general aspect, making a nanocomposite includes forming a first aqueous dispersion including zirconia nanoparticles and graphene oxide powder, combining a reducing agent with the first aqueous dispersion, irradiating the first aqueous dispersion with microwave radiation, thereby yielding a second aqueous dispersion comprising zirconia and graphene, and separating the nanocomposite from the second aqueous dispersion, wherein the nanocomposite comprises zirconia and graphene.

In a third general aspect, a polymer precursor solution includes a dispersion including polyacrylamide and a nanocomposite crosslinker including a metal oxide and two-dimensional nanosheets, wherein a weight ratio of the nanocomposite crosslinker to the polyacrylamide is in a range of 1:10 to 1:20 and a weight ratio of the metal oxide to the two-dimensional nanosheets is in a range of 2:1 to 19:1. In one example of the third general aspect, a weight ratio of the metal oxide to the two-dimensional nanosheets is in a range of 2:1 to 9:1.

In a fourth general aspect, a polymer gel includes polyacrylamide crosslinked with a nanocomposite including a metal oxide and two-dimensional nanosheets, wherein a weight ratio of the nanocomposite crosslinker to the polyacrylamide is in a range of 1:10 to 1:20 and a weight ratio of the metal oxide to the two-dimensional nanosheets is in a range of 2:1 to 19:1. In one example of the fourth general aspect, a weight ratio of the metal oxide to the two-dimensional nanosheets is in a range of 2:1 to 9:1.

Implementations of the first, second, third, and fourth general aspects may include one or more of the following features.

In some implementations, the weight ratio of the metal oxide to the two-dimensional nanosheets is about 19:1. In other implementations, the weight ratio of the metal oxide to the two-dimensional nanosheets is about 9:1. The metal oxide may include, consist of, or consist essentially of zirconia. The two-dimensional nanosheets may include, consist of, or consist essentially of reduced graphene oxide. The nanocomposite may include, consist of, or consist essentially of reduced graphene oxide and zirconia.

A weight average molecular weight of the polyacrylamide in the third and fourth general aspects is typically between about 500,000 and about 550,000 Daltons.

The details of one or more implementations of the subject matter described in this specification are set forth in the accompanying drawings and the following description. Other features, aspects, and advantages of the subject matter will become apparent from the description, the drawings, and the claims.

DETAILED DESCRIPTION

Figure 1:
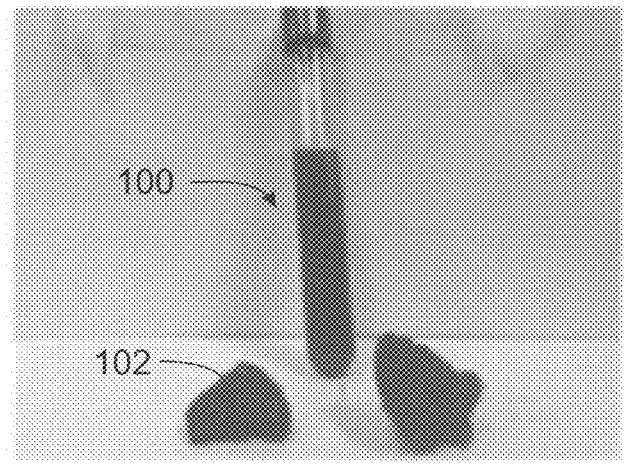
FIG. 1 is a photograph showing a solution containing a polymer and a nanocomposite crosslinker and the resulting polymer gel.

Polyacrylamide (PAM) polymer gels formed with nanocomposite crosslinkers described herein demonstrate high temperature stability, mechanical stability, and salinity resistance, and can be widely applied as water shutoff treatments to mature oil fields with excess water production. The nanocomposite crosslinkers include one or more metal oxides and one or more two-dimensional (2D) nanosheets. The nanocomposite typically includes a weight ratio of metal oxide to 2D nanosheet in a range of 2:1 to 19:1. In one example, the weight ratio of matal oxide to 2D nanosheet is in a range of 2:1 to 9:1. Examples of suitable metal oxides include zirconia and titania. Examples of suitable 2D nanosheets include graphene oxide (GO), a derivative of graphene oxide, as well as boron nitride (BN). As used in this disclosure, the term "derivative" refers to chemically modified graphene oxide, for example, graphene oxide that is modified with at least one functional group. Suitable examples of functional groups include carboxy group, amido group, imino group, and an alkyl group. The chemical modification includes covalent and non-covalent bonding. Some examples of non-covalent bonding include electrostatic and hydrophobic interactions, and Van der Waals forces. In one example, the term "derivative" refers to a chemically reduced graphene oxide (RGO), such as graphene oxide that is reduced with a hydrazine hydrate.

The nanocomposite crosslinker can be prepared by a facile, cost-effective, eco-friendly, and scalable chemical reduction method assisted by in situ microwave irradiation (MWI). In some embodiments, the nanocomposite crosslinker is prepared by forming a aqueous dispersion of 2D nanosheets and nanoparticulate metal oxide, combining a reducing agent with the dispersion, and irradiating the dispersion with microwave radiation. In some examples, the aqueous dispersion includes 1 weight percent (wt %) to 5 wt % of the 2D nanosheets and 1 wt % to 5 wt % of the nanoparticulate metal oxide. The microwave radiation is typically in a range of 500 watts (W) to 1000 W, with a reaction time ranging from 1 minute to 5 minutes. In one example, the 2D nanosheets are RGO, the nanoparticulate metal oxide is zirconia, and the reducing agent is hydrazine hydrate. Irradiating the dispersion with microwave radiation reduces the graphene oxide to graphene, yielding a suspension of a nanocomposite including graphene and zirconia. The nanocomposite is separated from the suspension, for example, by centrifugation, and dried.

A polymer gel precursor solution can be prepared by combining the nanocomposite and polyacrylamide in water to yield an aqueous dispersion. In some examples, the polymer gel precursor includes 0.2 wt % to 1 wt % nanocomposite and 1 wt % to 4 wt % polyacrylamide. The aqueous dispersion is heated to yield a polymer gel. In one example, the nanocomposite is dispersed in water, and polyacrylamide is added to the dispersion. Heating the dispersion to yield a polymer gel may include heating at a temperature of about 300° F. (for example, 310° F.) for a length of time sufficient to form a gel (for example, 2 hours to 4 hours).

EXAMPLE 115 milliliters (mL) of concentrated sulfuric acid is mixed with 2 grams natural graphite (Merck) to yield a mixture of partially oxidized graphite. The temperature of the mixture is maintained below 20 degrees Celsius (° C.). 2.5 g sodium nitrate and 20 g potassium permanganate were added sequentially while maintaining the temperature below 20 degrees Celsius (° C.). The resulting mix was then heated at 35-40° C. for 2 hours followed by addition of 230 ml of deionized water with temperature controlled under 50° C. The reaction was terminated with 20 mL of hydrogen peroxide and resulting graphene oxide was washed with 10% HCl to remove metal ions and deionized water until neutral pH is obtained. The graphene oxide residue was then dried at 60° C. to obtain dry graphene oxide for use in gels.

Experiment 1: 20 g of tetra-n-butylammonium bromide (TBAB) was dissolved in 250 mL ammonia (500 mL, 1.62 moles) at 80° C. To this solution, 700 mL aqueous 1 molar (M) $ZrOCl_2$ was added dropwise. The resulting mixture was stirred for 3 hours at room temperature to yield a transparent solution. The transparent solution was aged (sol maintained) for 24 hours at 100° C. in a water bath to form a gel. Deposited $ZrOCl_2$ in the TBAB template was filtered and dried at 80° C. for 2 days in an oven to yield a zirconia support. The zirconia support was calcined at 500° C. at a rate of 1° C. per minute for 3 hours under isothermal conditions. Experiment 2: 5 mg of cetyltrimethyl ammonium bromide (CTAB) was dissolved in 250 mL ammonia (500 mL, 1.62 moles) at 80° C. To this solution, 175 mL of aqueous solution of zirconyl salt ($ZrOCl_2$) (i.e. 65.375 mg $ZrOCl_2$ dissolved in 250 ml of distilled water) was added dropwise. The resulting mixture was stirred for 3 hours at room temperature to yield a transparent solution. The transparent solution was aged (sol maintained) for 24 hours at 100° C. in a water bath to form a gel. Deposited $ZrOCl_2$ in the CBAB template was filtered and dried at 80° C. for 2 days in an oven to yield a zirconia support. The zirconia support was calcined at 600° C. at a rate of 7° C. per minute for 2 hours under isothermal conditions.

400 milligrams (mg) of dried graphene oxide was stirred into 20 mL of deionized water until a homogeneous yellow dispersion was obtained. Zirconia was combined with the dispersion in a zirconia:graphene oxide weight ratio of 19:1, and 40 microliters (μL) of hydrazine hydrate was added. In another experiment a zirconia:graphene oxide weight ratio of 9:1 was used. The resulting dispersion was placed inside a microwave oven. The microwave oven (2.45 gigahertz (GHz)) was operated at full power (1000 W) for 30 second cycles (on for 10 seconds, off and stirring for 20 seconds) for a total reaction time of 1 to 2 minutes. The yellow dispersion gradually changed to a black color, indicating completion of the chemical reduction of the graphene oxide to graphene. The resulting dispersion was centrifuged for 15 minutes (5000 rotations per minute (rpm)) to yield a zirconia/RGO nanocomposite. The zirconia/RGO nanocomposite was dried overnight under vacuum.

Figure 2:
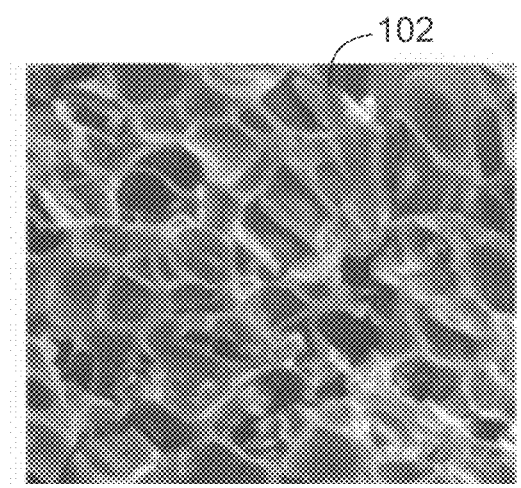
FIG. 2 is a scanning electron microscope (SEM) image of a polymer gel.

Zirconia/RGO nanocomposite was dispersed in water to yield a dispersion including 0.2 wt % of the nanocomposite. 4 wt % of polyacrylamide (weight average molecular weight (MW) 550,000, from SNF) was combined with the dispersion to yield a polymer gel precursor solution, and the polymer gel precursor solution was heated at 302° C. for 4 hours to yield a polymer gel. In another experiment, polymer gel precursor solution was heated at 310° C. FIG. 1 is an image showing polymer gel precursor solution 100 and the resulting polymer gel 102. FIG. 2 is a SEM image of the polymer gel 102 showing a porous honeycomb-like structure.

Figure 3A:
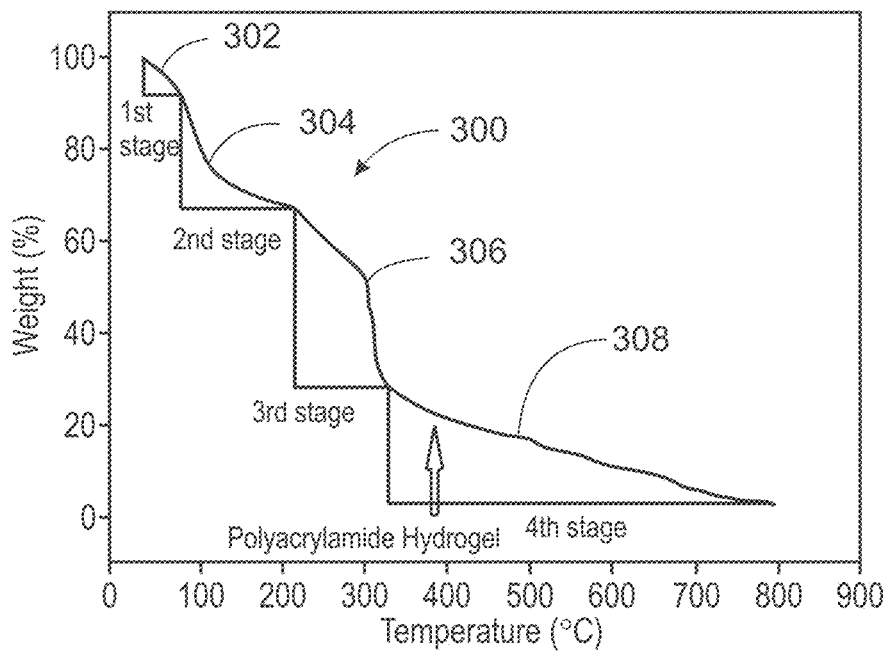
FIGS. 3A and 3B show thermogravimetric analysis (TGA) plots of polymer gels with and without a nanocomposite crosslinker, respectively.
Figure 3B:
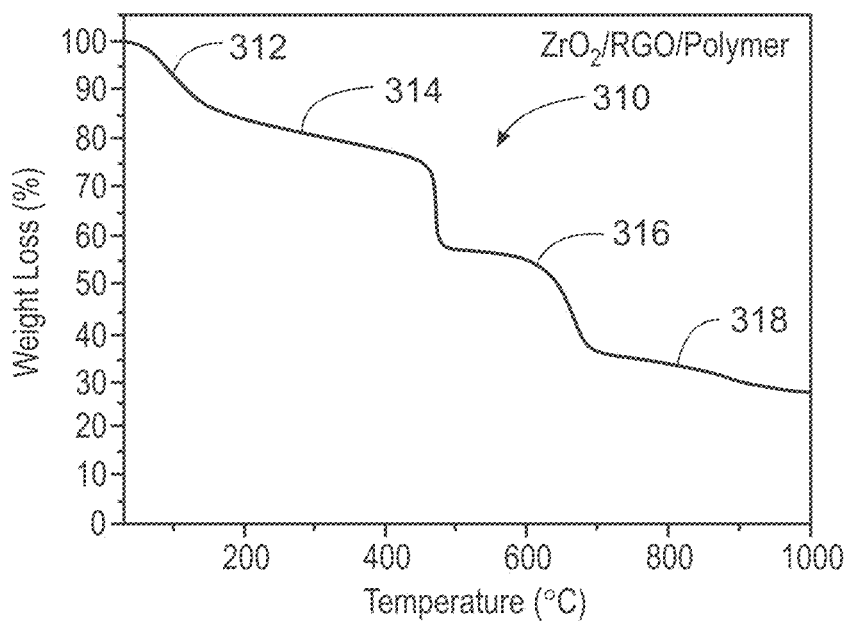

FIGS. 3A and 3B show thermograms of weight loss of a conventional polyacrylamide gel (no nanocomposite crosslinker) and a polyacrylamide gel formed as described in this example (4 wt % polyacrylamide and 0.2 wt % zirconia/RGO nanocomposite), respectively, as a function of temperature. The conventional gel included 7 wt % polyacrylamide, 4 wt % formaldehyde, and 10 wt % to 15 wt % methanol in water. Thermogram 300 in FIG. 3A shows four main decomposition regimes 302, 304, 306, and 308, starting at 30° C., 80° C., 210° C., and 320° C., respectively. Stage 302, up to 80° C., is believed to be due to water evaporation. Stages 304 and 306 are attributed to the decomposition of the amide and the carboxylate side groups of the polyacrylamide, respectively. Stage 308 is believed to be due to the decomposition of the polymer backbone. Like thermogram 300, thermogram 310 in FIG. 3B shows four main decomposition regimes 312, 314, 316, and 318. However, thermogram 310 shows a shift of the three high temperature regimes 314, 316, and 318 to 127° C., 478° C., and 685° C., respectively, believed to be due to the presence of the zirconia/RGO nanocomposite crosslinkers in polymer gel.

Figure 4:
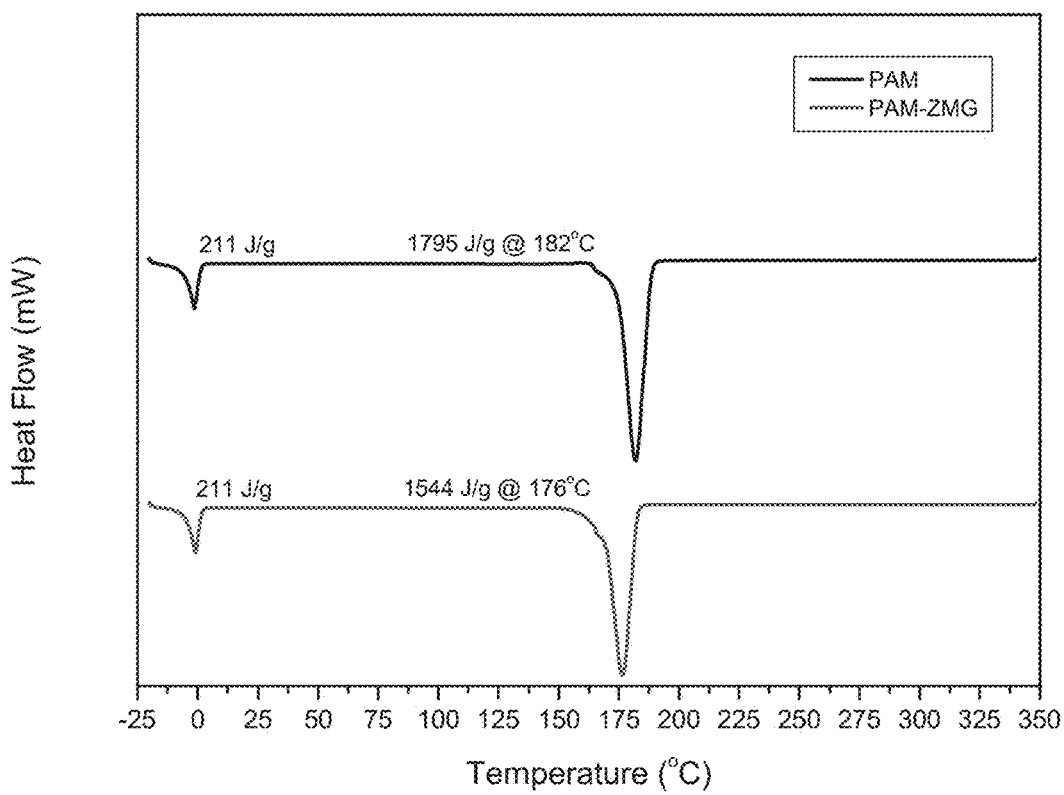
FIG. 4 depics differential scanning calorimetry (DSC) plots of polymer gels with and without a nanocomposite crosslinker.

FIG. 4 shows the differential scanning calorimetry (DSC) curves of the polyacrylamide gel (no nanocomposite crosslinker) and polyacrylamide gel with nanocomposite formed as described in this example (4 wt % polyacrylamide and 0.2 wt % zirconia/RGO nanocomposite), respectively, as a function of temperature. The significance of this experiment is to study the thermal stability of the polymer gel using DSC. The first endothermic peak (around 0° C.) represents the amount of free water present in the polymer gel while the second endothermic peak is the degradation enthalpy. As can be seen from the curves in FIG. 4, the amount of free water content remained the same for both gels, while the degradation enthalpy was reduced by 16% for the gel containing nanocomposite crosslinker. This indicates that less energy was required to break the bond between the polymer chains, and between the polymer and the nanocomposite. In addition, the degradation temperature (Tdeg) of the polymer gel reduced from 182° C. to 176° C. when nanocomposite was added. This reduction in Tdeg can be as a result of either (1) graphene acting as a lubricant thus encouraging the polymer molecules to move pass each other easily at lower temperature, (2) the polymer interphase was softened with less molecular mobility due to the presence of the nanocomposite or (3) structural alteration in the polymer chain that is, the polymer chain was shortened.

Figure 9:
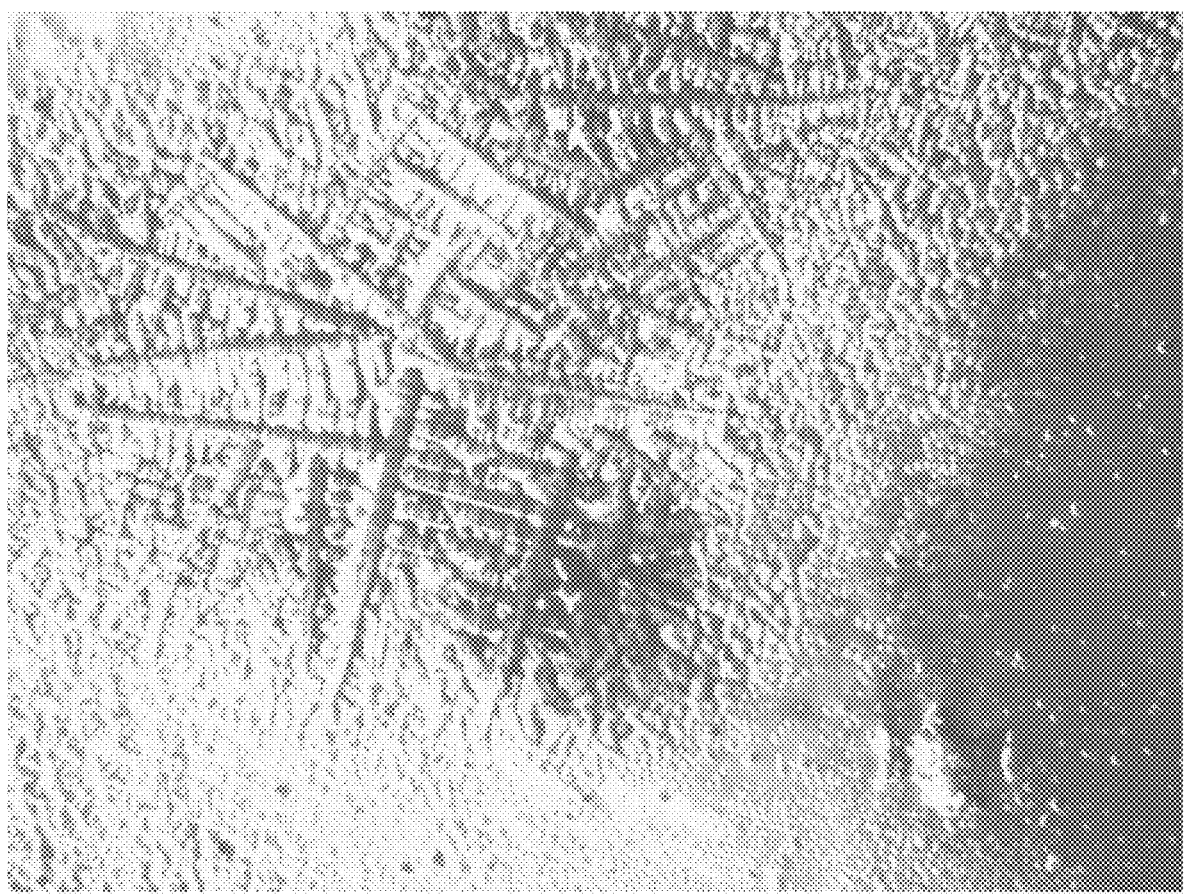
FIG. 9 shows optical microscope image of polymer with a nanocomposite gel.

FIG. 9 shows the optical microscope images obtained for the polymer with nanocomposite. This image shows that the polymer has short chain that is well branched entangled. This allows the polymer molecules to move past each other easily; making the gel less viscous at lower temperature (complementing the reduction in Tdeg).

Figure 5:
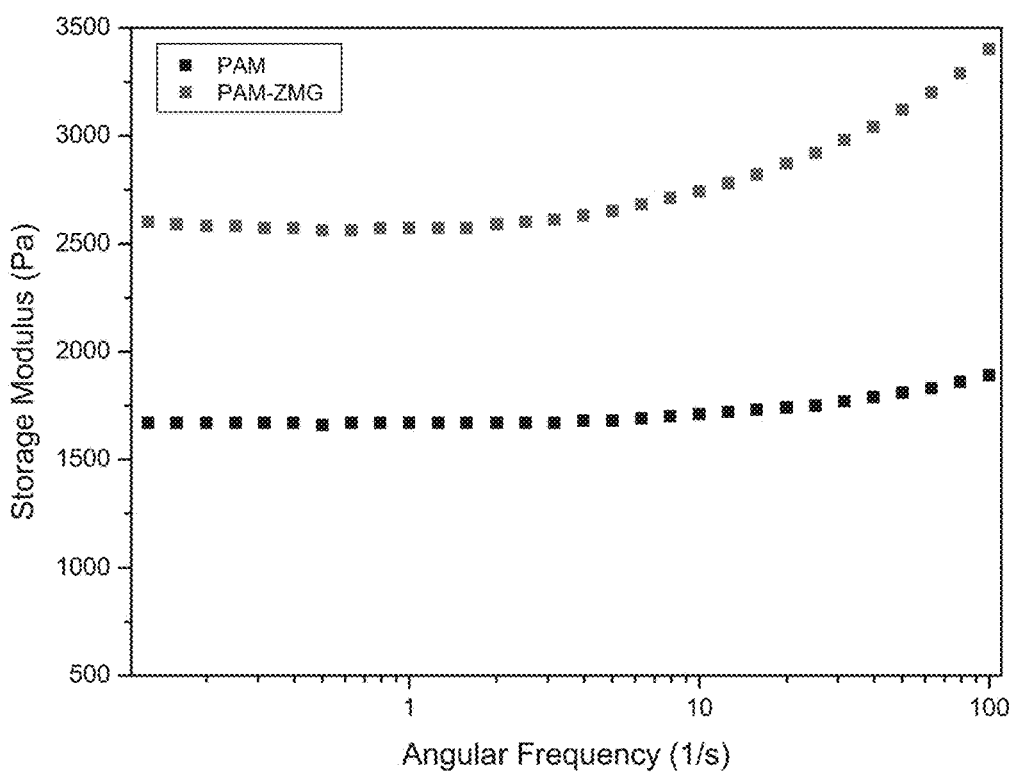
FIG. 5 shows dynamic mechanical analysis (DMA) plots of polymer gels with and without a nanocomposite crosslinker.

FIG. 5 depicts the storage modulus of the polymer gel (without nanocomposite crosslinker) in comparison to polymer gel formed as described in this example (4 wt. % polyacrylamide and 0.2 wt. % zirconia/RGO nanocomposite) measured by Dynamic mechanical Analysis (DMA). The elasticity of the polymer gel was enhanced when incorporated with the nanocomposite (0.2 wt. % zirconia/RGO). This is evident from the 80% increase in storage modulus noted in FIG. 5. This can be credited to the interphase and structural adjustment of the polymer gel in presence of the nanocomposite that caused the stiffness of the polymer gel to increase.

Figure 6:
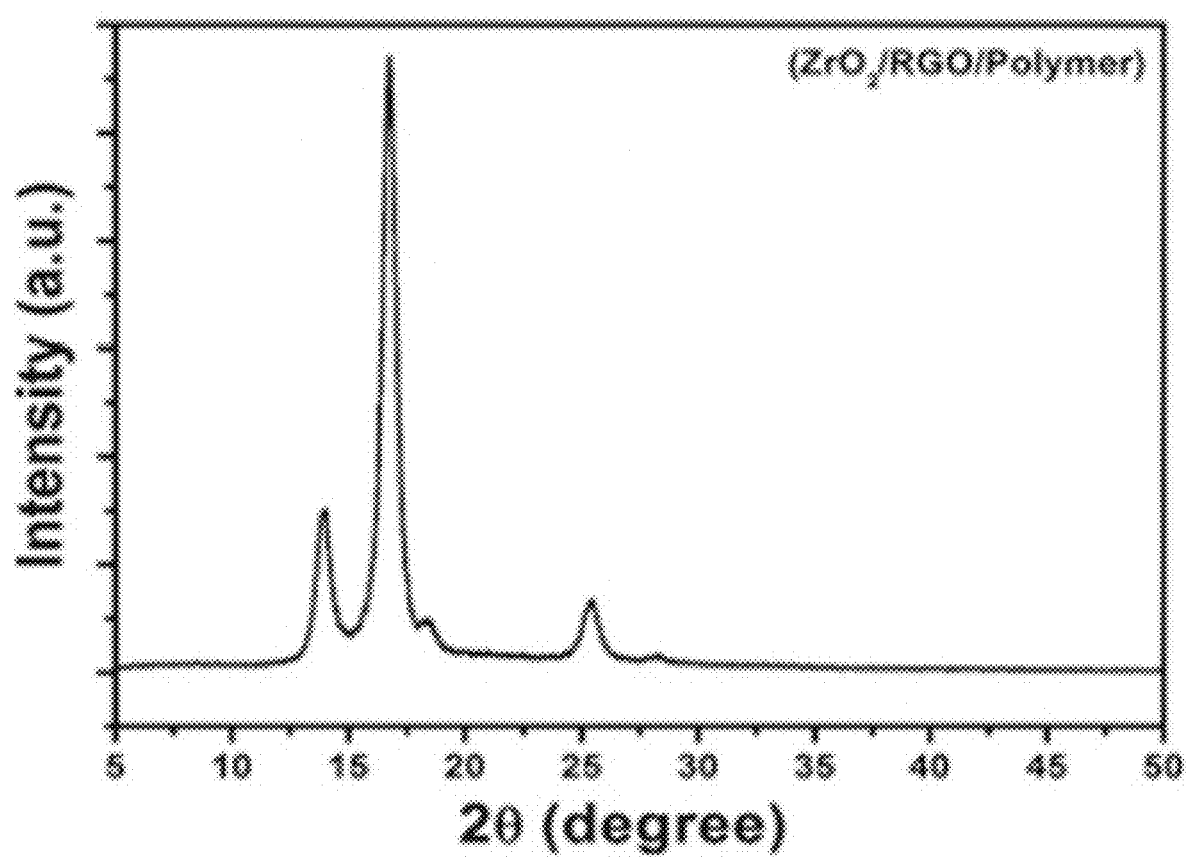
FIG. 6 shows an X-ray diffraction (XRD) pattern of a polymer gel with a nanocomposite crosslinker.

FIG. 6 shows an X-ray diffraction (XRD) pattern of a polymer gel formed as described in this example (4 wt. % polyacrylamide and 0.2 wt. % zirconia/RGO nanocomposite). FIG. 6 shows peaks at 2 theta (2θ) at about 13.9°, 16.7°, 18.5°, 25.3°, and 28.2°, representing diffraction from the zirconia and RGO in the polymer gel.

Figure 7A:
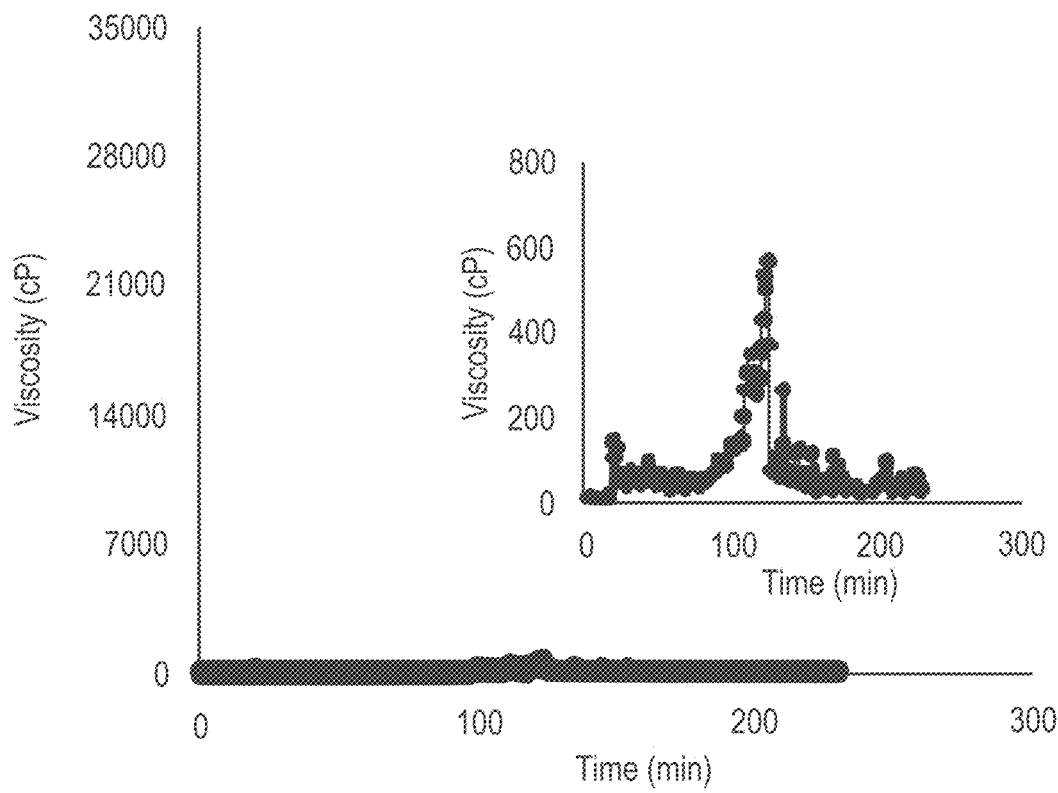
FIGS. 7A and 7B show plots of viscosity versus time at 310 degrees Fahrenheit (° F.) for polymer gels with and without a nanocomposite crosslinker, respectively.
Figure 7B:
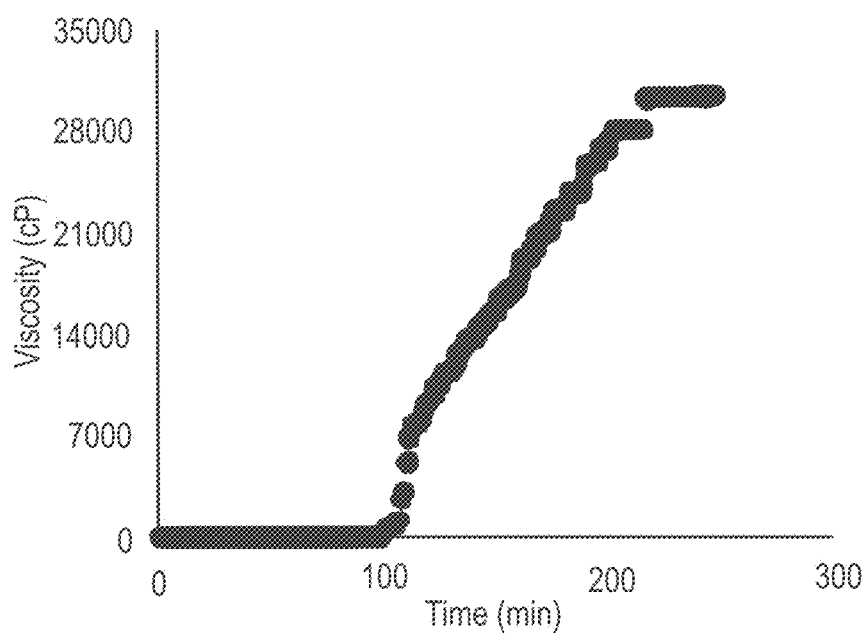

FIGS. 7A and 7B show viscosity at 310° F. as a function of time for a conventional polyacrylamide gel (no nanocomposite crosslinker) and the polyacrylamide gel of this example (4 wt. % polyacrylamide and 0.2 wt % zirconia/RGO nanocomposite) measured in a high-temperature high-pressure viscometer. The conventional gel included 7 wt. % polyacrylamide, 4 wt. % formaldehyde, and 10 wt. % to 15 wt. % methanol in water. For both polymer gels, gel formation occurred after 100 minutes had elapsed. The inset in FIG. 7A shows a short-lived increase in viscosity to 600 cP after 100 minutes for the polymer gel without the nanocomposite. FIG. 7B shows an increase in viscosity to 32000 centipoise (cP) after 100 minutes that remained stable and without degradation for at least an additional 120 minutes, for the gel containing the nanocomposite of this example.

Figure 8:
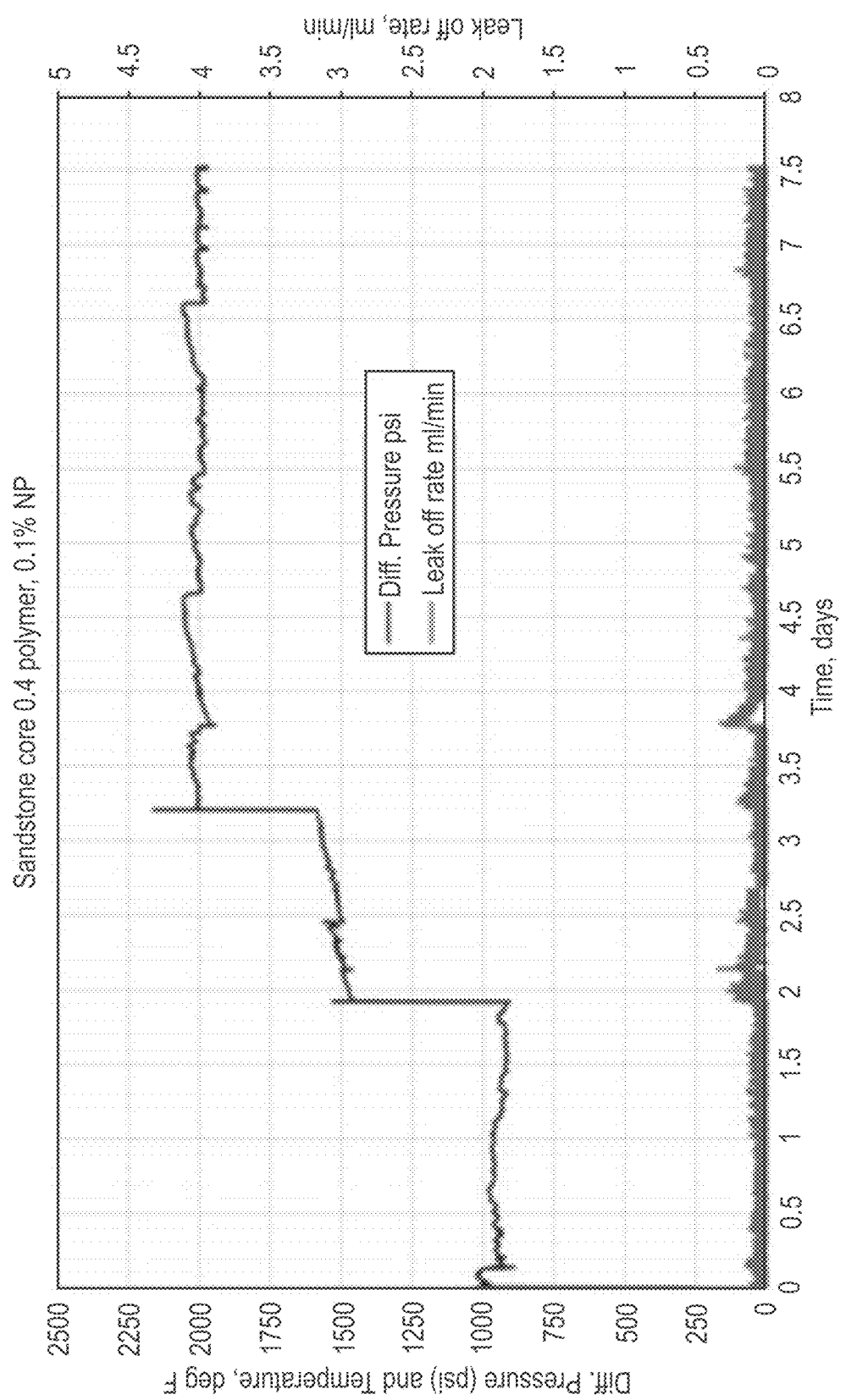
FIG. 8 shows differential pressure and leak-off rate versus time for a polymer gel with a nanocomposite crosslinker.

FIG. 8 shows results of a core flooding test to evaluate the strength of the polyacrylamide nanocomposite gel of this example. The test was performed at different pressures, and demonstrated that the resulting gel is stable at a pressure of 2000 pounds per square inch (psi) for 7 days with negligible water leak off. Once the curing time (48 hours) is completed, the formation brine was injected (post-injection) to determine the plugging efficiency of the chemical treatment. FIG. 8 depicts the pressure drop during all stages with respect to time. A sharp increase in injection pressure with a total differential pressure of 850 psi at the initial injectivity test after chemical curing can be seen. The measured differential pressure is equivalent to 2,550 psi per foot (ft) holding pressure for the treated matrix by this water shut-off material. Afterward the endurance test was started, and the differential pressure was held at 800 psi for 1 hour, then 1500 psi for some time. This was followed with an extended period of 180 hours at differential pressure of 2000 pounds per square inch differential (psid) with minimal leak-off through the treated core plug. The averaged measured leak-off rate during this period was 0.0018 cubic centimeters per minute ($cm^3$/min.) The equivalent drawdown pressure that the core was able to withstand was 6000 psi/ft (2000 psid for a 3-inch core plug) 0.0018 $cm^3$/min.

Thus, the polyacrylamide nanocomposite gel of this example was stable at ultra-high temperatures (for example, 310° F.) and obtained a pressure of 2000 psi. In comparison, a conventional polyacrylamide gel (no nanocomposite crosslinker) obtained a pressure of 5 psi and dropped suddenly. In addition, the viscosity of the polyacrylamide nanocomposite gel exceeded that of a conventional polyacrylamide gel (no nanocomposite crosslinker) by a factor of 50. Thus, the polyacrylamide nanocomposite gels demonstrate enhanced mechanical and thermal stability and can significantly reduce excess water production in mature water oil fields.

CERTAIN EMBODIMENTS

In some embodiments, this the invention may be described in the following paragraphs 1-36.

Paragraph 1. A nanocomposite comprising:

a metal oxide comprising at least one of zirconia and titania; and two-dimensional nanosheets comprising at least one of graphene oxide, a derivative of graphene oxide, and boron nitride;

wherein a weight ratio of the metal oxide to the two-dimensional nanosheets is in a range of 2:1 to 19:1.

Paragraph 2. The nanocomposite of paragraph 1, wherein:

two-dimensional nanosheets comprise a derivative of graphene oxide comprising reduced graphene oxide; and weight ratio of the metal oxide to the two-dimensional nanosheets is in a range of 2:1 to 9:1.

Paragraph 3. The nanocomposite of paragraph 1, wherein the weight ratio of the metal oxide to the two-dimensional nanosheets is about 19:1.

Paragraph 4. The nanocomposite of paragraph 1, wherein the weight ratio of the metal oxide to the two-dimensional nanosheets is about 9:1.

Paragraph 5. The nanocomposite of paragraph 1, wherein the metal oxide comprises zirconia.

Paragraph 6. The nanocomposite of paragraph 5, wherein the metal oxide consists of or consists essentially of zirconia.

Paragraph 7. The nanocomposite of paragraph 1, wherein the two-dimensional nanosheets comprise reduced graphene oxide.

Paragraph 8. The nanocomposite of paragraph 7, wherein the two-dimensional nanosheets consist of or consist essentially of reduced graphene oxide.

Paragraph 9. The nanocomposite of paragraph 1, wherein the nanocomposite comprises reduced graphene oxide and zirconia.

Paragraph 10. The nanocomposite of paragraph 9, wherein the nanocomposite consists of or consists essentially of reduced graphene oxide and zirconia.

Paragraph 11. A method of making a nanocomposite, the method comprising:
forming a first aqueous dispersion comprising zirconia nanoparticles and graphene oxide powder;
combining a reducing agent with the first aqueous dispersion;
irradiating the first aqueous dispersion with microwave radiation, thereby yielding a second aqueous dispersion comprising zirconia and graphene; and
separating the nanocomposite from the second aqueous dispersion, wherein the nanocomposite comprises zirconia and graphene.

Paragraph 12. The method of paragraph 11, wherein a weight ratio of the zirconia nanoparticles and graphene oxide is in a range of 2:1 to 19:1.

Paragraph 13. The method of paragraph 11, wherein a weight ratio of the zirconia nanoparticles and graphene oxide is in a range of 2:1 to 9:1.

Paragraph 14. The method of paragraph 12, wherein the weight ratio of the zirconia nanoparticles to the graphene oxide is about 19:1.

Paragraph 15. The method of paragraph 12, wherein the weight ratio of the zirconia nanoparticles to the graphene oxide is about 9:1.

Paragraph 16. A polymer precursor solution comprising:
a dispersion comprising polyacrylamide and a nanocomposite crosslinker comprising a metal oxide and two-dimensional nanosheets, wherein a weight ratio of the nanocomposite crosslinker to the polyacrylamide is in a range of 1:10 to 1:20 and a weight ratio of the metal oxide to the two-dimensional nanosheets is in a range of 2:1 to 19:1.

Paragraph 17. The polymer precursor solution of paragraph 16, wherein the weight ratio of the metal oxide and the two-dimensional nanosheets is in a range of 2:1 to 9:1.

Paragraph 18. The polymer precursor solution of paragraph 16, wherein the weight ratio of the metal oxide and the two-dimensional nanosheets is about 19:1.

Paragraph 19. The polymer precursor solution of paragraph 16, wherein the metal oxide comprises zirconia.

Paragraph 20. The polymer precursor solution of paragraph 19, wherein the metal oxide consists of or consists essentially of zirconia.

Paragraph 21. The polymer precursor solution of paragraph 16, wherein the two-dimensional nanosheets comprise reduced graphene oxide.

Paragraph 22. The polymer precursor solution of paragraph 16, wherein the two-dimensional nanosheets consist of or consist essentially of reduced graphene oxide.

Paragraph 23. The polymer precursor solution of paragraph 16, wherein the nanocomposite crosslinker comprises reduced graphene oxide and zirconia.

Paragraph 24. The polymer precursor solution of paragraph 23, wherein the nanocomposite crosslinker consists of or consists essentially of reduced graphene oxide and zirconia.

Paragraph 25. The polymer precursor solution of paragraph 16, wherein a weight average molecular weight of the polyacrylamide is between 500,000 and 550,000 Daltons.

Paragraph 26. A polymer gel comprising:
polyacrylamide crosslinked with a nanocomposite comprising a metal oxide and two-dimensional nanosheets, wherein a weight ratio of the nanocomposite crosslinker to the polyacrylamide is in a range of 1:10 to 1:20 and a weight ratio of the metal oxide to the two-dimensional nanosheets is in a range of 2:1 to 19:1.

Paragraph 27. The polymer gel of paragraph 26, wherein the weight ratio of the metal oxide to the two-dimensional nanosheets is in a range of 2:1 to 9:1.

Paragraph 28. The polymer gel of paragraph 26, wherein the weight ratio of the metal oxide and the two-dimensional nanosheets is about 19:1.

Paragraph 29. The polymer gel of paragraph 26, wherein the weight ratio of the metal oxide and the two-dimensional nanosheets is about 9:1.

Paragraph 30. The polymer gel of paragraph 26, wherein the metal oxide comprises zirconia.

Paragraph 31. The polymer gel of paragraph 30, wherein the metal oxide consists of or consists essentially of zirconia.

Paragraph 32. The polymer gel of paragraph 26, wherein the two-dimensional nanosheets comprise reduced graphene oxide.

Paragraph 33. The polymer gel of paragraph 32, wherein the two-dimensional nanosheets consist of or consist essentially of reduced graphene oxide.

Paragraph 34. The polymer gel of paragraph 26, wherein the nanocomposite crosslinker comprises reduced graphene oxide and zirconia.

Paragraph 35. The polymer gel of paragraph 34, wherein the nanocomposite crosslinker consists of or consists essentially of reduced graphene oxide and zirconia.

Paragraph 36. The polymer gel of paragraph 26, wherein a weight average molecular weight of the polyacrylamide is between 500,000 and 550,000 Daltons.

Thus, particular implementations of the subject matter have been described. Other implementations are within the scope of the claims.

What is claimed is:
1. A nanocomposite comprising:
a nanocomposite that is a nanocomposite crosslinker comprising:
a metal oxide comprising at least one of zirconia or titania; and
two-dimensional nanosheets comprising at least one of a derivative of graphene oxide, or boron nitride, wherein a weight ratio of the metal oxide to the two-dimensional nanosheets is in a range of 2:1 to 19:1, the nanocomposite crosslinker for polyacrylamide.

2. The nanocomposite of claim 1, wherein the two-dimensional nanosheets comprise the derivative of graphene oxide comprising reduced graphene oxide, and wherein the weight ratio of the metal oxide to the two-dimensional nanosheets is in a range of 2:1 to 9:1.

3. The nanocomposite of claim 1, wherein the nanocomposite crosslinker is configured for a weight ratio of the nanocomposite crosslinker to the polyacrylamide in a range of 1:10 to 1:20.

4. The nanocomposite of claim 1, wherein the nanocomposite crosslinker is configured for polyacrylamide having a weight average molecular weight between 500,000 and 550,000.

5. The nanocomposite of claim 1, wherein the two-dimensional nanosheets comprise the derivative of graphene oxide comprising reduced graphene oxide, and wherein the nanocomposite crosslinker is configured for a dispersion comprising the nanocomposite crosslinker and the polyacrylamide to give a polymer precursor solution.

6. The nanocomposite of claim 5, wherein the nanocomposite comprises the zirconia.

* * * * *